(12) United States Patent
Ikenoue et al.

(10) Patent No.: US 7,940,957 B2
(45) Date of Patent: May 10, 2011

(54) OBJECT TRACKER FOR VISUALLY TRACKING OBJECT MOTION

(75) Inventors: Shoichi Ikenoue, Chiba (JP); Takayuki Sakamoto, Kanagawa (JP); Hidehiko Morisada, Tokyo (JP)

(73) Assignee: Sony Computer Entertainment Inc., Tokyo (JP)

(*) Notice: Subject to any disclaimer, the term of this patent is extended or adjusted under 35 U.S.C. 154(b) by 1013 days.

(21) Appl. No.: 11/755,870

(22) Filed: May 31, 2007

(65) Prior Publication Data

US 2008/0063236 A1 Mar. 13, 2008

(30) Foreign Application Priority Data

Jun. 9, 2006 (JP) .................................. 2006-161687

(51) Int. Cl.
*G06K 9/00* (2006.01)
*H04N 7/18* (2006.01)
*H04N 5/225* (2006.01)

(52) U.S. Cl. ......... 382/103; 348/154; 348/155; 348/169

(58) Field of Classification Search .................. 382/103, 382/107, 236, 287; 348/169, 170, 171, 172, 348/94, 154, 155, 208.1, 208.2, 208.14, 208.16, 348/352

See application file for complete search history.

(56) References Cited

U.S. PATENT DOCUMENTS

| | | | | |
|---|---|---|---|---|
| 7,376,246 | B2* | 5/2008 | Shao et al. ..................... | 382/103 |
| 7,835,542 | B2* | 11/2010 | Lin et al. ....................... | 382/103 |
| 7,860,344 | B1* | 12/2010 | Fitzpatrick et al. ............ | 382/291 |

FOREIGN PATENT DOCUMENTS

| | | |
|---|---|---|
| JP | 2001-92978 | 4/2001 |
| JP | 2005-165688 | 6/2005 |

OTHER PUBLICATIONS

Michael Isard et al. "Contour Tracking by stochastic propagation of conditional density" Proc. European Conference on Computer Vision, vol. 1, pp. 343-356, 1996.
Michael Isard et al. "A mixed-state CONDENSATION tracker with automatic model-switching" Proc. 6th Int. Conf. Computer Vision, 1998.
Michael Isard et al. "ICONDENSATION: Unifying low-level and high-level tracking in a stochastic framework" Proc 5th European Conf. Computer Vision, 1998.
Michael Isard et al. "CONDENSATION—conditional density propagation for visual tracking" Int. J. Computer Vision, 1998.
Notification of Reason(s) for Refusal dated Jul. 1, 2008, from the corresponding Japanese Application.
Jianyu Wang, et al. "Interacting Multiple Model Particle Filter to Adaptive Visual Tracking" Proceedings of the Third International Conference on Image and Graphics, IEEE Computer Society, Dec. 31, 2004, pp. 568-571.
Kenji Oka et al. "Head Pose Estimation System Based on Particle Filtering with Adaptive Diffusion Control", IEICE Report, vol. J88-D-II, No. 8, Aug. 1, 2005, pp. 1601-1613.

* cited by examiner

*Primary Examiner* — Abolfazl Tabatabai
(74) *Attorney, Agent, or Firm* — Katten Muchin Rosenman LLP (57) ABSTRACT

A tracking start-and-stop determining unit of a tracking processing unit determines whether to start or stop tracking based on a predetermined condition. During tracking, a sampling unit 29 creates or eliminates particles using a probability density distribution estimated for the previous image frame. A first to $n^{th}$ model tracking units transit the particles according to motion models respectively assigned, and observe the likelihood of a candidate curve corresponding to each particle with respect to an edge image generated by an image processing unit. A tracking integration unit determines a motion model which causes the highest likelihood, and estimates a probability density distribution using an observation likelihood based on the motion model.

14 Claims, 7 Drawing Sheets

FIG.8

OBJECT TRACKER FOR VISUALLY TRACKING OBJECT MOTION

BACKGROUND OF THE INVENTION

1. Field of the Invention

The present invention relates to information processing techniques, and in particular to an object tracker for tracking an object in an input image and an object tracking method performed therein.

2. Description of the Related Art

Visual tracking is essential for many applications such as computer vision, human-machine interfacing, and human-human interfacing. Computer vision is especially focused in security technologies such as visual surveillance, and audio and visual technologies such as analysis, classification, and editing of recorded images. Human-human interfacing includes teleconferencing and videotelephony. Accordingly, there have been many studies undertaken on visual tracking, with a number of those specifically addressing tracking accuracy and processing efficiency. A major approach to visual tracking is now based on a particle filter. The particle filter attracts attention as a time series analysis tool for systems with non-Gaussian noise, which the well known Kalman filter cannot deal with. The CONDENSATION algorithm (Conditional Density Propagation) is well known as a technique based on a particle filter (see Michael Isard and Andrew Blake: Contour tracking by stochastic propagation of conditional density, *Proc. European Conf. Computer Vision*, vol. 1, 1996, pp. 343-356, Cambridge, UK, and Michael Isard and Andrew Blake: CONDENSATION—conditional density propagation for visual tracking, *Int. Conf. J. Computer Vision*, 29, 1, 5-28 (1998), as examples).

The particle filter is a computation method for the approximation of the Bayesian filter, and represents the probability distribution of a target object by introducing a finite number of particles as target candidates. The probability distribution of the target object is used for time series estimations and predictions. When the particle filter is used for visual tracking, the motion of a parameterized object is described as one particle, and the particle filter sequentially estimates the probability distributions of the object in the parameter space by parameter transition based on motion models and observation for calculating the likelihood of the transition results. However, the particle filter is relatively less effective for the motion of an object that cannot be fully represented by a preconfigured motion model. Therefore, the success of the particle filter largely depends on how a motion model is constructed.

When using conventional standard particle filters for visual tracking, a motion models is selected from various motion models depending on the type of image being observed. However, tracking using a single motion model requires fixed characteristics of object motion in the parameter space and thus is applicable only in limited circumstances. This is because the tracking performance drops significantly when the single motion model cannot properly describe the object motion within the parameter space. In contrast, a tracking technique that switches between multiple motion models is proposed (for example, see Michael Isard and Andrew Blake. A mixed-state CONDENSATION tracker with automatic mode-switching, *Proc. 6th Int. Conf. Computer Vision*, 1988). This tracking technique, however, is impractical as it requires learning of the switching timing and it is effective only when the learning result converges.

Related Art List

Contour tracking by stochastic propagation of conditional density, Michael Isard and Andrew Blake, Proc. European Conf. on Computer Vision, vol. 1, pp. 343-356, Cambridge UK (1996).

CONDENSATION—conditional density propagation for visual tracking, Michael Isard and Andrew Blake, Int. J. Computer Vision, 29, 1, 5-28 (1998).

A mixed-state Condensation tracker with automatic model-switching, Michael Isard and Andrew Blake, Proc. 6th Int. Conf. Computer Vision, 1998.

ICondensation: Unifying low-level and high-level tracking in a stochastic framework, Michael Isard and Andrew Blake, Proc 5th European Conf. Computer VIsion, 1998.

SUMMARY OF THE INVENTION

The present invention has been developed in view of the aforementioned problems and a general purpose thereof is to provide a technology capable of adaptive, efficient, and continuous tracking of a target object even when its motion characteristics change.

One embodiment of the present invention relates to an object tracker. The object tracker comprises: a sampling unit which generates particles based on an estimated existence probability distribution of a target object in a first image frame, the particles being used for a particle filter in a parameter space where target candidates are defined, the first image frame being contained in a video stream together with a second image frame; a plurality of model tracking units which correspond respectively to multiple motion models and observe likelihoods of the target candidates with respect to the target object in the second image frame, the target candidates being defined by the particles transited according to each motion model; and a tracking integration unit which chooses one of the motion models based on a comparison of the likelihoods observed by the model tracking unit, and estimates an existence probability distribution of the target object in the second image frame based on the likelihood of a target candidate which is defined according to the motion model chosen.

Note that it makes no difference if the first image frame and second image frame are two contiguous or discontiguous image frames in a video stream. The first image frame is usually observed prior to the second image frame in general object tracking over time, but this order is not limited thereto in the present embodiment.

The existence probability distribution may be located in the position coordinates of the target object in the image frame or may be located in the parameter space for an attribute of the target object, such as shape, color, size, or a combination thereof. The target candidate may be represented by a two-dimensional shape specified by shape or size, or by a numerical value. The likelihood represents a measurement of how well the target candidate describes the target object. For example, if the target candidate is represented by a two-dimensional shape, the likelihood represents an overlap of the target candidate and the target object, or a distance between the target candidate and the target object. If the target candidate is represented by a numerical value, the likelihood represents a difference between the numerical value of the target candidate and a numerical value representing the target object.

The particles being used are the ones used for the particle filter, which is a technique used for estimating the current state of particles based on previous information and current observation information. The weight of the parameter to be observed is represented by the number of particles in the parameter space.

Another embodiment of the present invention relates to an object tracking method. The object tracking method is performed by a computer, and comprises: storing a received video stream in a memory; reading a first image frame in the video stream from the memory, and calculating amounts of changes of a target object using multiple hypothetical motion models from an existence probability distribution of the target object in the first image frame; comparing temporary characteristics of the target object specified by the amounts of changes calculated with true characteristics of the target object in a second image frame read from the memory, and choosing a motion model describing the temporary characteristics with the highest likelihood from the multiple hypothetical motion models based on the result of comparison; and estimating an existence probability distribution of the target object in the second image frame.

Arbitrary combinations of the aforementioned constituting elements, and implementations of the invention in the form of methods, apparatuses, systems, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
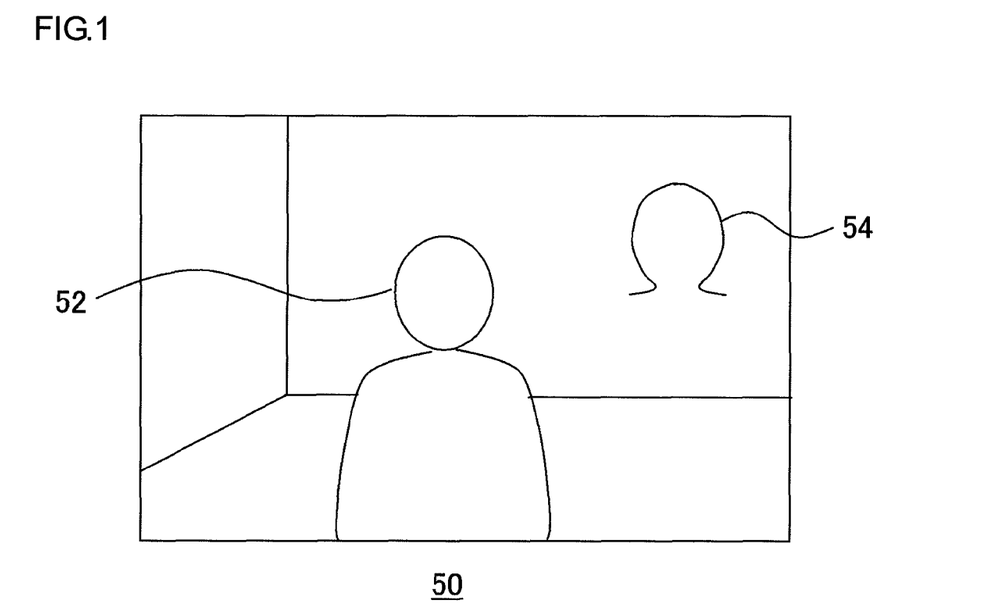
FIG. 1 illustrates a visual tracking method for a person being a target object.

Visual tracking using a particle filter will now be described to clarify the features and advantages of the various embodiments of the present invention. FIG. 1 illustrates a visual tracking method where a person is the target object. The video stream to be processed, such as a live-action motion picture, or computer-generated animation, consists of image frames. An image of a person 50 is one of the image frames and shows a person 52 being the target object.

In order to track the motion of the person 52, the head and shoulder contours of the person 52 (hereinafter, simply referred to as the head contour) is approximated by an ohm-shaped curve 54 where the ohm-shaped curve 54 is described by a known representation. The image of the person 50, which shows the person 52, is subjected to an edge extracting process, and an edge image is thereby obtained. The shape and position of the curve 54 is then changed by changing the parameters describing the curve 54, and edge near the curve 54 is detected so as to obtain the parameters that best match the head contour of the person 52. The above process is repeated for each frame, so that tracking of the person 52 proceeds. In this instance, the edge is positions at which density or color changes drastically in an image.

The matching of various curves 54 and the head contour of the person 52 is implemented by a probability distribution prediction technique using a particle filter. Specifically, the number of the target candidates is reduced by increasing or decreasing the sampling number of the curve 54 according to a probability distribution in the parameter space of the previous image frame. As a result, it becomes possible to focus the search on areas where the existence probability is high, allowing for accurate, efficient matching.

Applications of the particle filter to tracking which focuses on object contours are described in detail in, for example, Michael Isard and Andrew Blake, ICONDENSATION: Unifying low-level and high-level tracking in a stochastic framework, *Proc. 5th European Conf. Computer Vision,* 1998. The process required to apply such a tracking technique to the present invention is described below.

The ohm-shaped curve 54 is first described by a B-spline curve. The B-spline curve is represented by n control points (Q0, ... Qn) and n unit points (s0, ... sn). These parameters are preset to describe a fundamental curve shape, in this instance being an ohm shape. The fundamental curve described by the preset parameters is hereinafter referred to as the template $Q_0$. Note that the shape described by the template $Q_0$ depends on a target object and in the present instance is an ohm shape when the person 52 shown in FIG. 1 is the target object. For example, when the target object is a ball, the curve to be described has a circular shape; when the target object is a palm, the curve has a palm shape.

Next, a shape-space vector x is given as the transformation parameters for changing the template shape. The shape-space vector x is represented by six parameters as follows:

$$x = (\text{shift}_x, \text{shift}_y, \text{extend}_x \cos\theta - 1, \text{extend}_y \cos\theta - 1, \text{extend}_x \sin\theta, \text{extend}_y \sin\theta)^T \quad (1)$$

where ($\text{shift}_x$, $\text{shift}_y$) is a translation amount in (x, y) direction, ($\text{extend}_x$, $\text{extend}_y$) is a magnification, and $\theta$ is a rotation angle.

Using the operational matrix W for operating the shape-space vector x on the template $Q_0$, the curve after transformation, i.e., the candidate curve Q, is represented as follows:

$$Q = Wx + Q_0, \quad (2)$$

$$W = \begin{pmatrix} 1 & 0 & Q_0^x & 0 & 0 & Q_0^y \\ 0 & 1 & 0 & Q_0^y & Q_0^x & 0 \end{pmatrix}$$

Equation (2) with the six parameters of the shape-space vector x changed accordingly makes it possible to translate, rotate, expand, and contract the template and combinations of these operations allow the candidate curve Q to change its shape and position accordingly.

Next, the edges of the person 52 close to the respective unit points of multiple candidate curves are detected. The multiple candidate curves are described by the various parameters of the template $Q_0$, such as intervals of the control points and unit points, and various sets of the six parameters of the shape-space vector x. Likelihoods of the candidate curves are then calculated from the distances between the edges and the unit points. The probability density distribution in the six-dimensional space spanned by the six parameters of the shape-space vector x is estimated based on these likelihoods.

Figure 2:
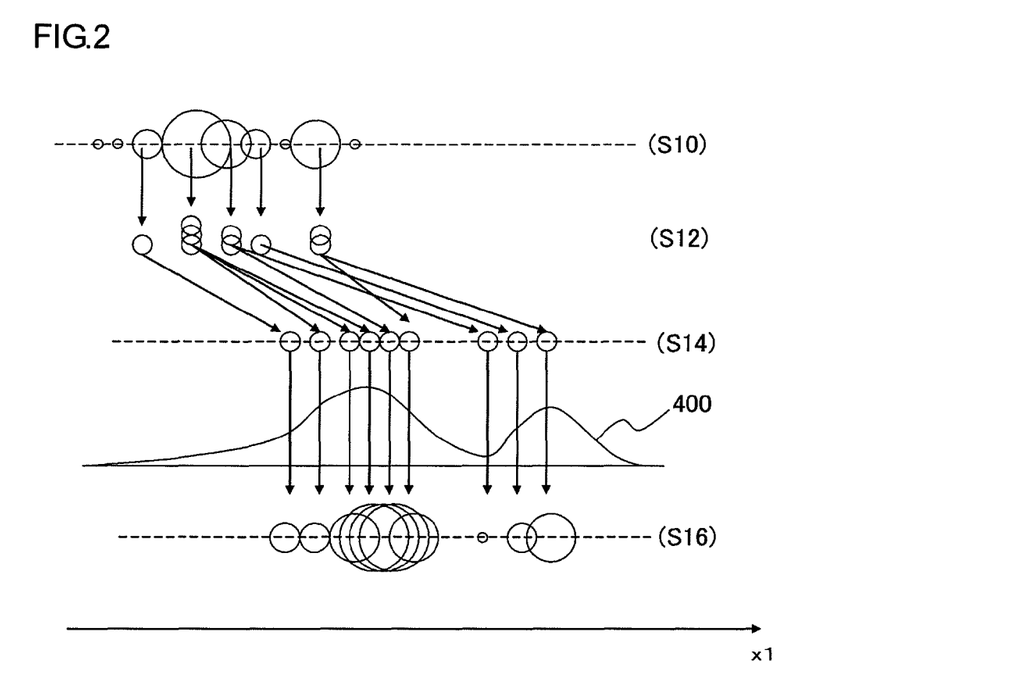
FIG. 2 illustrates a probability density estimation using a particle filter.

FIG. 2 illustrates a probability density distribution estimation using a particle filter. In FIG. 2, the horizontal axis shows parameter x1, which is one of the six parameters of the shape-space vector x, to aid understanding of the present invention. However, it should be appreciated that the other parameters are actually processed in the same manner as the parameter x1 in the six-dimensional space. In this instance, consider the example where the image frame whose probability density distribution is to be estimated is at timestep t.

A probability density distribution in the axis for the parameter x1 is given (S10). This probability density distribution is estimated in the image frame at timestep t−1, which is one frame previous to the image frame at timestep t. Particles at timestep t are then created using the estimated probability density distribution (S12). If there are already particles obtained by filtering, it is determined at this point whether the particles are divided or eliminated. The probability density distribution given at step S10 is discretely calculated in accordance with the coordinates in the parameter space, and it shows that the larger the circle, the higher the probability density.

The particles are a representation of the sample values of the parameter x1 and the sampling densities. For example, a high probability density region of parameter x1 at timestep t−1 is described by particles with a high density, so that sampling is focused thereon; a low probability density region is described by particles with a low density, so that the sampling number is small. This allows for efficient matching by creating a large number of the candidate curves near the edge of the person 52, for example.

The particles are then transited in the parameter space using a given motion model (S14). The motion model is, for example, a Gaussian motion model, or an autoregression motion model. The Gaussian motion model defines that a probability density at timestep t shows a Gaussian distribution around each probability density at timestep t−1. The autoregression motion model is a technique that hypothesizes an autoregression prediction model obtained by more than second-order analysis of sample data; for example, it hypothesizes from changes in the previous parameters that the person 52 moves at a constant speed. With reference to FIG. 2, the motion in the positive direction of the parameter x1 can be assumed by the autoregression motion model, and the particles are transited accordingly.

The edges of the person 52 close to the candidate curve specified by each particle is detected using the edge image at timestep t, the likelihoods of the candidate curves are calculated using the detection result, and the probability density distribution at timestep t is estimated based on these likelihoods (S16). As described above, the estimated probability density distribution discretely shows a true probability density distribution 400, as shown in S16. The probability density distribution at each timestep is described in the parameter space by repeating the above detailed process. For example, when a probability density distribution is unimodal, in other words, if there is only one target object, a curve closest to the target object is obtained by finally setting, as each parameter, a sum of the parameter values which are weighted according to the probability densities.

The probability density distribution $p(\hat{x}_t^i)$ at timestep t estimated in S16 is calculated as follows:

$$p(\hat{x}_t^i) = \eta p(y_t|\hat{x}_t^i) \int p(\hat{x}_t^i|\hat{x}_t^i, u_{t-1}) p(\hat{x}_{t-1}^i) d\hat{x}_{t-1}^i \quad (3)$$

where i is a unique particle number, $p(\hat{x}_t^i|\hat{x}_t^i, u_{t-1})$ is a given motion model, and $p(y_t|\hat{x}_t^i)$ is a likelihood.

When the Gaussian motion model is used as the motion model, the edge search range is uniformly spread around one particle at the previous timestep in the parameter space. Such a motion model makes it easy to track various motions, such as linear motion and meandering. However, when the target object moves beyond the search range, the candidate curves described by the particles transited are sometimes far away from the real edges. Such candidate curves may cause the tracking to fail due to an unsuccessful edge detection. If the standard deviation of the Gaussian distribution is increased to distribute the particles widely, this problem can be overcome. However, this requires an increase in the number of particles in order to maintain a sufficient observation density. As a result, there are problems with the Gaussian motion model. For example, it requires more computation time and has a low noise resistance.

Conversely, with the autoregression motion model, if the motion model matches with an autoregression prediction, it gives a high computation efficiency and a high noise resistance. This is because the particles can be effectively utilized. However, if the object motion is unexpected, it is highly likely that the tracking will fail.

As described above, since the motion models are suitable for different motion characteristics, the choice of motion models is an important factor. However, the inventors has found that it is difficult to accurately track a target object which has multiple motion characteristics changing over time even if the most suitable motion model is chosen. Consequently, the present embodiment provides that multiple motion models, which are suitable for multiple motion characteristics of the target object, are prepared, and the motion models are adaptively switched, thereby allowing for accurate tracking even for a target object with multiple motion characteristics.

Figure 3:
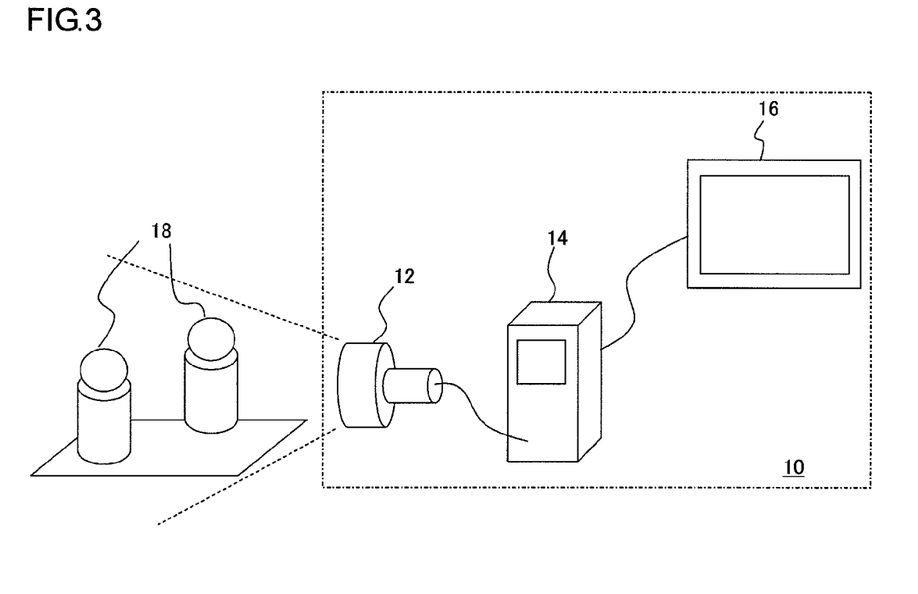
FIG. 3 shows an exemplary configuration of a visual tracking system according to an embodiment of the present invention.

FIG. 3 shows a configuration of a visual tracking system according to one embodiment of the present invention. The visual tracking system 10 comprises an imaging device 12 which captures a target object 18, a tracker 14 that performs a tracking process, and a display 16 which shows image data obtained by the imaging device 12 and/or the tracking result data. The target object 18 depends on the intended use of the visual tracking system 10, and it is, for example, a person(s), an article(s), or their parts. However, in the following description, the target object 18 is a person as detailed above.

The tracker 14 and the imaging device 12 or the display 16 are connected to each other regardless of whether the connection is wired or wireless or they may be connected through specific networks. Alternatively, any two of or all of the imaging device 12, tracker 14, and display 16 may be integrally provided. In a certain use environment, the imaging device 12 and display 16 may not always be connected to the tracker 14.

The imaging device 12 acquires image data at a predetermined frame rate. The image data includes images of the target object 18 or images of a specific place with or without the target object 18 included. The image data acquired is input into the tracker 14 and the target object 18 is subjected to a tracking process. The process result is then output to the display 16 as output data controlled by the tracker 14. The tracker 14 may be a computer which performs other functions which use, for example, the tracking result data, i.e., the position and shape information of the target object 18.

Figure 4:
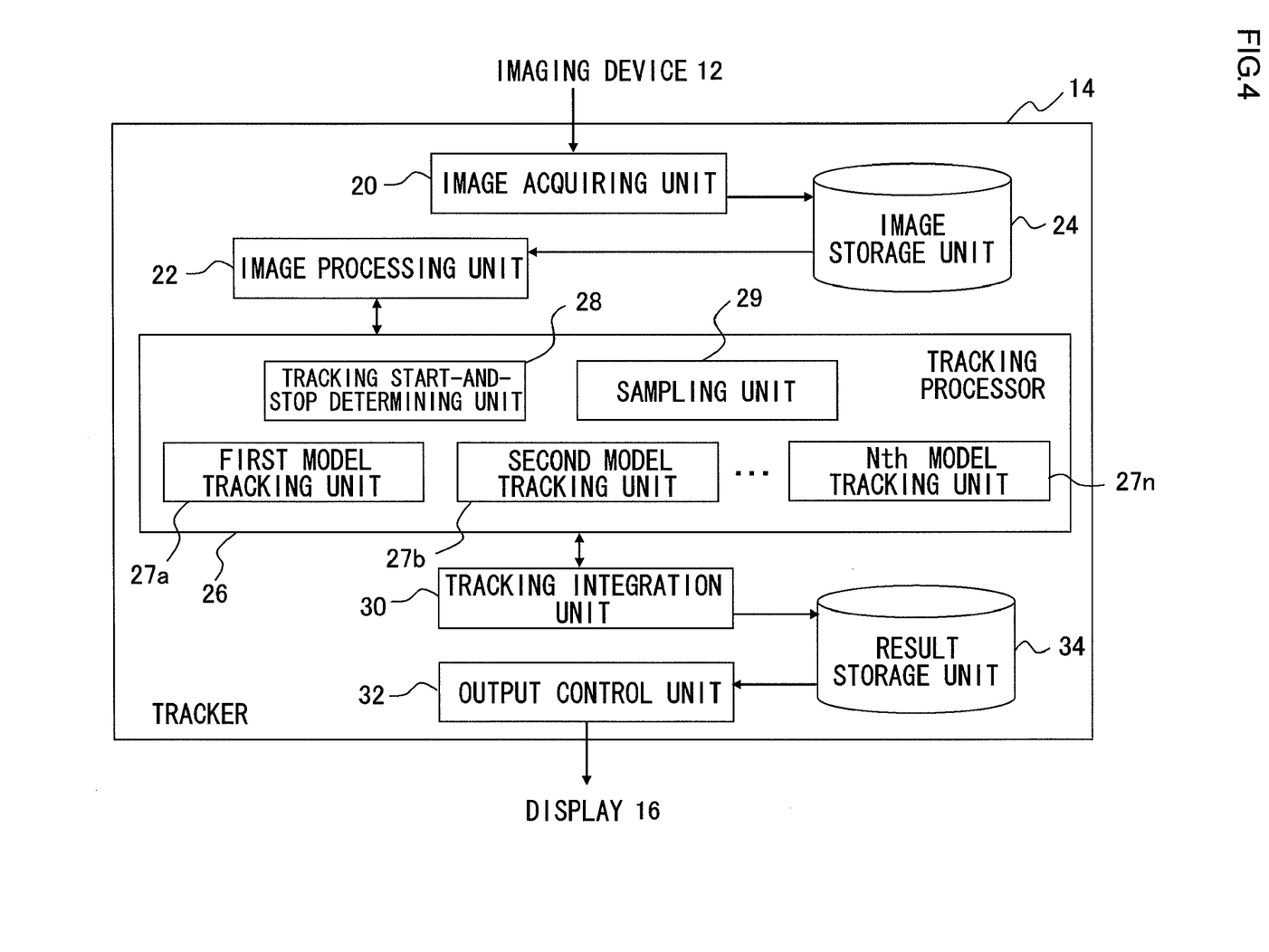
FIG. 4 shows a configuration of a tracker according to the embodiment.

FIG. 4 shows a detailed configuration of the tracker 14. The tracker 14 comprises an image acquiring unit 20 which acquires the image data input by the imaging device 12, an image storage unit 24 which stores the input image data, an image processing unit 22 which generates an edge image and the like from the input image data, a tracking processing unit 26 which performs the tracking process on the edge image based on multiple motion models, a tracking integration unit 30 which chooses at least one of the multiple tracking results accordingly and integrates the results chosen, a result storage unit 34 which stores the final tracking result data, and an output control unit 32 which controls the output of the tracking result data to the display 16.

In FIG. 4, the components described as functional blocks which perform various processes are provided by hardware such as CPU, memory, and other LSI, or by software such as image processing programs and the like. Accordingly, it is obvious to those skilled in the art to provide the functional blocks as, but not limited to, only hardware components, only software components, or a combination thereof.

The tracking processing unit 26 comprises a tracking start-and-stop determining unit 28, a sampling unit 29, and n model tracking units 27 which include a first model tracking unit 27a, a second model tracking unit 27b, . . . , and an $n^{th}$ model tracking unit 27n, where n is the number of motion models used for the tracking process. Specifically, the first model tracking unit 27a, the second model tracking unit 27b, . . . , and the $n^{th}$ model tracking unit 27n are preset with different motion models, and the likelihoods of the candidate curves described by the particles transited based on each motion model are calculated therein. In other words, in the present embodiment, the tracking processes using the multiple motion models are performed by the tracking processing unit 26 in parallel. The motion models set in the first model tracking unit 27a through the $n^{th}$ model tracking unit 27n are determined according to compatibility with expected motion characteristics of the target object. This allows the model tracking units 27 to process all the motion characteristics.

The tracking start-and-stop determining unit 28 determines the starting and stopping of tracking based on predetermined conditions. The stopping includes suspension of tracking due to occlusion. The tracking is started, for example, when the target object appears in the viewing angle of the imaging device 12 or appears from behind something. The tracking is stopped, for example, when the target object passes out of the viewing angle of the imaging device 12 or hides behind something.

The sampling unit 29 creates and eliminates particles based on the probability density distribution estimated for the image frame at the previous timestep t−1. The sampling unit 29 also starts the process when receiving a tracking start signal from the tracking start-and-stop determining unit 28, and stops the process when receiving a tracking stop signal.

The image processing unit 22 extracts the contour of the target object. Specifically, the image processing unit 22 performs an edge extracting process on each image frame of the input image data stored in the image storage unit 24 to generate edge images. A typical edge extracting algorithm, such as the Canny edge filter or the Sobel filter, may be used in the edge extracting process. The image processing unit 22 may perform preprocess prior to the edge extracting process, in order to efficiently extract the edges of the target object. For example, the image processing unit 22 includes a foreground extractor (not shown) which uses background subtraction, thereby extracting foreground objects including the target object from the input image.

The image processing unit 22 may extract the contour of the target object in a manner other than that used by the aforementioned typical edge extracting algorithm. For example, the contour of the target object may be extracted as curves describing the outlines of the foreground objects which are extracted from the input image or may be extracted by a combination of known multiple algorithms. Any of the contours extracted in those manners are referred to as "the edges" in the following description. Accordingly, "the edge images" generated by the image processing unit 22 are used synonymously with "the contour extracted images."

The tracking integration unit 30 compares observation likelihoods at the timestep t. The observation likelihoods are obtained from n series of temporary tracking results output from the tracking processing unit 26, i.e., candidate curves obtained based on n motion models. The tracking integration unit 30 then determines the true tracking result at timestep t using the values of the motion model corresponding to the highest observation likelihood. The tracking integration unit 30 thus calculates the probability density distribution $p(\hat{x}_t^i)$, obtains tracking result data such as the position and shape of the target object, and returns the data to the tracking processing unit 26. The tracking processing unit 26 uses the data for the tracking process at the next timestep t+1.

The aforementioned processes in the tracking processing unit 26 and tracking integration unit 30 are represented by the following equation:

$$p(\hat{x}_t^i) = \eta \max_{\{m=1 \ldots n\}} (p(y_t|\hat{x}_{t,m}^i) \int p_m(\hat{x}_{t,m}^i|\hat{x}_t^i, u_{t-1}) p(\hat{x}_{t-1}^i) d\hat{x}_{t-1}^i) \quad (4)$$

where m ($1 \leq m \leq n$) is the unique number of n motion models.

If there is a plurality of target objects, the tracking processing unit 26 and tracking integration unit 30 may perform tracking using templates specific to respective target objects and combine the tracking results to obtain one tracking result. The tracking integration unit 30 also detects an overlap of the target objects and precludes one behind another from the tracking targets at a certain timing. Accordingly, even when a current target object hides behind another target object, and thus its observation likelihood temporarily goes down, it is possible to prevent the output of an incorrect tracking result.

The tracking integration unit 30 calculates the final parameter values, being for example a sum of parameter values weighted with the estimated probability density distributions. The tracking integration unit 30 then stores the resultant image data in the result storage unit 34. The resultant image data includes only the curve described by the final parameter values, or a composite image of the curve and the input image, for example.

The aforementioned processes in the image processing unit 22, tracking processing unit 26, and tracking integration unit 30 are performed for each image frame, and thus tracking results are obtained. Video data including the tracking results are then stored in the result storage unit 34. The video data is output to the display 16 under control of the output control unit 32, thereby displaying the template curve moving as the target object moves. As described above, the tracking results may not only be displayed as video data but also subjected to other processes suitable for its intended use, for example, the tracking results may be output to another operation module.

Figure 5:
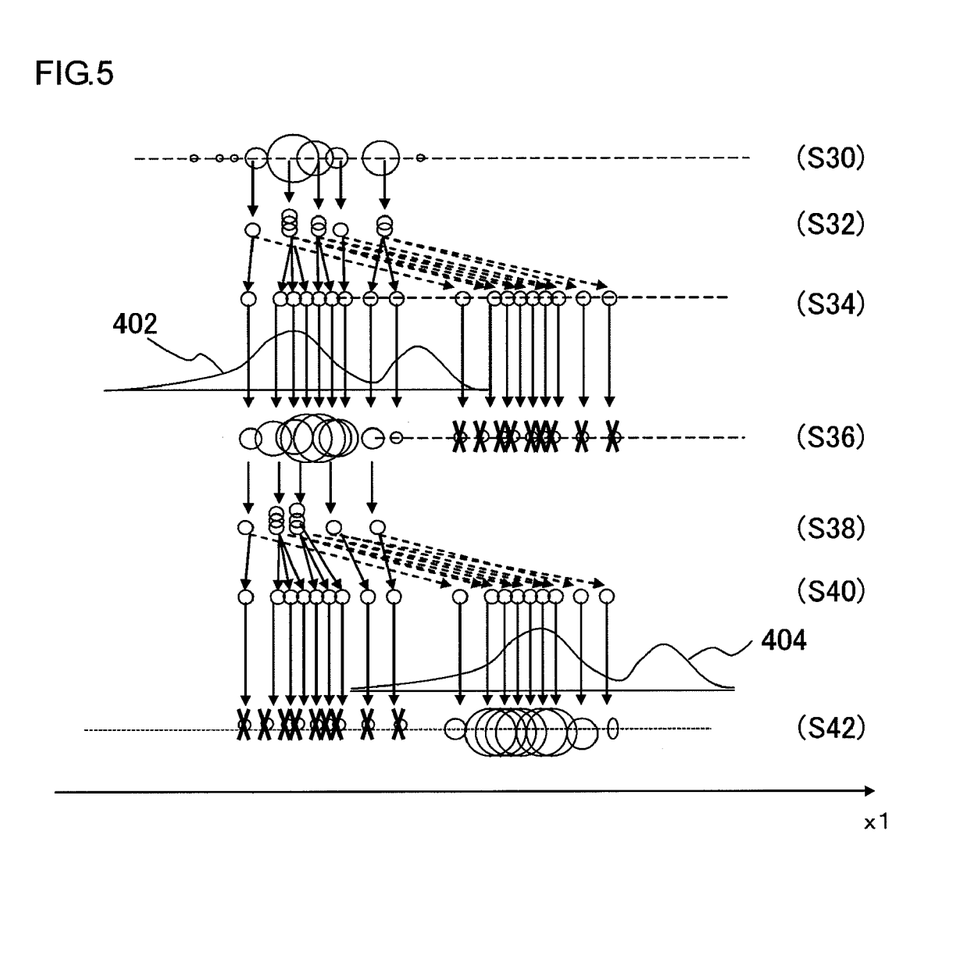
FIG. 5 illustrates a probability density estimation performed by a tracking processing unit and a tracking integration unit in the embodiment.

FIG. 5 illustrates a probability density estimation performed by the tracking processing unit 26 and tracking integration unit 30 according to one embodiment of the present invention. The representation of the probability density estimation shown in FIG. 5 is the same as that shown in FIG. 2. A discrete probability density distribution of the parameter x1 is first prepared (S30). The discrete probability density distribution is estimated in the image frame at timestep t−1 in the same manner as that shown in FIG. 2. It is then determined based on the discrete probability density distribution as to whether the particles at timestep t are divided or eliminated (S32).

Next, the particles are transited using, for example, a Gaussian motion model and an autoregression motion model (S34). Each of the particles is in multiple transition states depending on the multiple motion models used, such as the Gaussian motion model or autoregression motion model. With reference to FIG. 5, it is assumed by the autoregression motion model that the target object moves so that the parameter x1 moves further in the positive direction. Then edge detection is performed in the edge image at timestep t in order to calculate the likelihoods of the candidate curves.

Specifically, a likelihood is calculated for each particle and for each of the Gaussian motion model and the autoregression motion model. The motion model giving the highest likelihood to an individual particle is chosen as the best motion model of the particle in the present embodiment. The probability density distribution at timestep t is then estimated from the observation likelihoods of the candidate curves obtained by the motion models chosen for the respective particles (S36). With reference to FIG. 5, the probability density distribution obtained by the unchosen motion model is indicated by the "x" marks.

Similarly, it is determined based on the discrete probability density distribution estimated at timestep t whether the particles are divided or eliminated (S38). The particles are transited again using a Gaussian motion model and an autoregression motion model (S40). Next, the likelihoods of the candidate curves are calculated by searching in the edge images of the subsequent frame image at timestep t+1 for each motion model and the probability density distribution at timestep t+1 is estimated based on the motion model giving the highest likelihoods (S42). In this way, the motion model which estimates the probability density distribution closest to the true probability density distributions 402 and 404 is automatically determined based on the observation likelihoods.

The operation of the tracker 14 in the tracking process is described below. Consider that the imaging device 12 is installed as a fixed camera at a company entrance or the like and the visual tracking system 10 is used to analyze a visitor. The imaging device 12 captures a certain region around the entrance at a predetermined frame rate, regardless of the visitor being the target object. The captured image is input into the image acquiring unit 20 of the tracker 14 and is then stored in the image storage unit 24.

Figure 6:
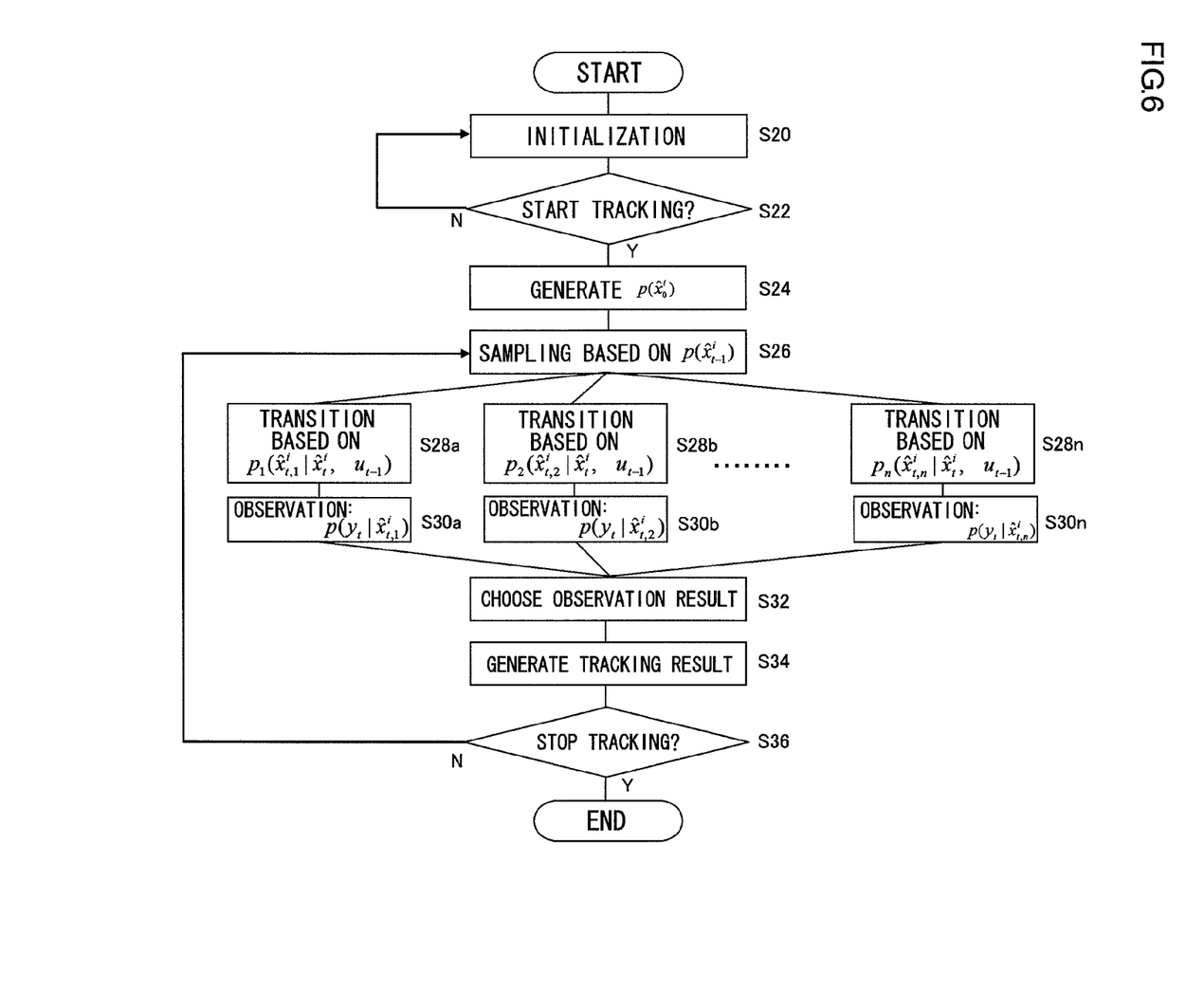
FIG. 6 is a flow chart showing a tracking process according to the embodiment.

FIG. 6 is a flow chart showing the tracking process according to one embodiment of the present invention. Specifically, FIG. 6 shows a process performed by the tracker 14 for a specific period. The specific period is from just before the visitor appears to just after the visitor leaves. Since the target object is a person, the template for an ohm-shaped curve is provided in the tracker 14 as described previously. The template may be described by other representations which can describe a desired curve, instead of the B-spline curve. The template shape may also be transformed by any manner that flexibly transforms the shape by changing several types of parameters.

First, the tracking start-and-stop determining unit 28 reads the input image data stored in the image storage unit 24 for each image frame to determine whether to start tracking (S20, S22). For example, when a foreground object extracted from an image frame matches an object having a predetermined size and shape by which a person is identified, the tracking start-and-stop determining unit 28 starts tracking. The foreground size and shape being the criteria for determining a match may be determined in either a logical or experiential way. A foreground extracting process may be performed by a foreground extractor (not shown) included in the image processing unit 22. In this case, the tracking start-and-stop determining unit 28 requests the image processing unit 22 to perform the foreground extracting process. Alternatively, the tracking start-and-stop determining unit 28 may include a foreground extractor.

Steps S20 and S22 are repeated until the tracking start-and-stop determining unit 28 determines to start tracking. If the tracking start-and-stop determining unit 28 determines to start tracking (S22: Y), a probability density distribution $p(\hat{x}_0^i)$ in an image frame to be processed is generated (S24). In this instance, the timestep t of the image frame is initialized: t=0. Moreover, the sampling unit 29 requests the image processing unit 22 to perform the edge extracting process for the image frame. In response to this, the image processing unit 22 performs the edge extracting process on a foreground object having a predetermined size and shape by which a person is identified to extract its edges, and then transmits the edge image data to the sampling unit 29.

The sampling unit 29 generates a probability density distribution $p(\hat{x}_0^i)$ from the edge image data received. For example, particles are uniformly placed over a certain region of the parameter space, and the probability density distribution $p(\hat{x}_0^i)$ is calculated by observing the likelihoods of the candidate curves described by the particles, as shown in Equation (3). Note that in this case, there is no transition of the particles based on motion models.

The sampling unit 29 may request the image processing unit 22 to perform another edge extracting process for the following image frame in addition to the edge extracting process for the current image frame. The edge image in the following image frame is used for the tracking process by the first model tracking unit 27a through to the $n^{th}$ model tracking unit 27n.

The sampling unit 29 then generates a corresponding number of particles to the probability density distribution $p(\hat{x}_0^i)$ over the parameter space (S26: t−1=0). The corresponding number is adjusted in consideration of the process load based on the calculation resource capacity of the tracker 14, and a required rate of output result and the like.

The first model tracking unit 27a through to the $n^{th}$ model tracking unit 27n transits the particles based on the n motion models respectively assigned (S28a to S28n). In this instance, autoregression prediction-based motion model is introduced, and the motion models that can describe characteristic human motions, such as uniform motion, looking in the imaging device 12, stooping, and bending backward are provided.

Gaussian motion model is also provided. The Gaussian motion model covers motions other than such specific human motions, such as swinging in random directions, and moving twitchily, and has a smaller standard deviation. The minimum standard deviations required to cover the object motions are calculated in advance by experiments or simulations. The smaller standard deviations prevent double sampling of motions that are covered by autoregression prediction, thereby providing an efficient tracking process.

Multiple Gaussian motion models with different standard deviations may be provided and respectively assigned to some of the model tracking units 27, which include the first model tracking unit 27a through to the $n^{th}$ model tracking unit 27n. As described in the aforementioned document, ICONDENSATION: Unifying low-level and high-level tracking in a stochastic framework, a model which predicts that the target object will move closer to the foreground area may be provided.

The first model tracking unit 27a through to the $n^{th}$ model tracking unit 27n then detects edges close to the ohm-shaped candidate curves corresponding to the particles transited based on respective motion models, using the edge image which is generated by the image processing unit 22 from the next frame at timestep t=1, and observes the likelihoods $p(y_t|\hat{x}_t^i)$ (S30a to S30n). The edge detection method will be described later.

The tracking integration unit 30 determines a motion model giving the highest of the n likelihoods observed by the first model tracking unit 27a through to the $n^{th}$ model tracking unit 27n, thereby choosing the observation result for each particle (S32). Accordingly, it is possible to calculate the probability density distribution $p(\hat{x}_1^i)$ at timestep t=1. If there are multiple target objects, the above process is performed for each target object.

The tracking integration unit 30 then generates the desired tracking result data and stores it in the result storage unit (S34). Specifically, for example, the tracking integration unit 30 finally determines an ohm-shaped candidate curve that describes the shape and position of the target object based on a sum of parameter values weighted with the probability density distribution $p(\hat{x}_1^i)$, and generates image data in which the curve is superimposed on to the original input image frame.

Next, the tracking start-and-stop determining unit 28 determines whether to continue or stop the tracking process (S36). For example, when a predetermined time has elapsed in the state where there is no foreground object having a predetermined size and shape by which a person is identified, the tracking start-and-stop determining unit 28 determines that the tracking process should stop. A foreground extracting result generated by the image processing unit 22 in the edge extracting process can be used as the foreground data used for this determination. The tracking start-and-stop determining unit 28 also includes a timer (not shown) to measure time elapsed from the disappearance of the foreground objects. For example, the stopping of tracking is determined immediately after a flag is raised when a predetermined time, being based on experimental data and the like, has elapsed.

The tracking start-and-stop determining unit 28 further determines to stop the tracking after a predetermined time has elapsed in the occlusion state, for example, when the current target object hides behind another target object in real space. In this case, the tracking integration unit 30 first detects that multiple target objects are approaching each other based on a result of the tracking process, and determines that the target object described by a smaller ohm-shaped curve is hiding behind another one. Alternatively, a distance measurement system (not shown) included in the imaging device 12 may determine whether the target object is hiding behind another target object. When both target objects overlap, the tracking start-and-stop determining unit 28 starts observing the time elapsed. When a predetermined time has elapsed in the overlapping state, the tracking start-and-stop determining unit 28 determines to stop tracking the hidden target object.

This means that the tracking of the hidden target object continues until the predetermined time has elapsed. Accordingly, when the occlusion is maintained for a short period, for example, when both target objects pass each other, efficiency of the tracking the target object appearing again is prevented from being reduced. Even when the likelihoods are temporarily reduced due to occlusion, the tracking integration unit 30 detects the occlusion, thereby allowing efficient tracking to continue.

The tracking start-and-stop determining unit 28 further determines to stop the tracking after a predetermined time has elapsed in the state where the target object is out of the viewing angle of the imaging device 12. The motion of the target object going out of the viewing angle is also detected by the tracking integration unit 30. The tracking start-and-stop determining unit 28 includes a timer for observing elapsed time and a flag for indicating that the predetermined time has elapsed, in order to stop tracking in response to any of the above three states.

When the continuation of the tracking process is determined in S36, the sampling unit 29 creates and eliminates particles to perform sampling on the image frame at timestep t=2 using the probability density distribution $p(\hat{x}_1^i)$ at timestep t=1 obtained in S32 (S26). The processes of S26 to S34 are repeated for each image frame until the tracking start-and-stop determining unit 28 determines to stop tracking in S36. Accordingly, video data in which an ohm-shaped curve changes its motion and shape over time while following those of the visitor's head, being the target object, is stored in the result storage unit 34. The output control unit 32 outputs the video data to the display 16, or to a module providing other functions and the like, thereby enabling the user to use the tracking result as desired.

Detecting for edges close to an ohm-shaped candidate curve is described below. The detection is performed by the first model tracking unit 27a through to the $n^{th}$ model tracking unit 27n in S30a to S30n. According to the edge detection generally used in the CONDENSATION algorithm and the like, edges are searched for along the normal of the candidate curve for each unit point, and the smallest distance between edge and unit point is calculated. However, since many particles are essentially located in a high probability density region, candidate curves tends to gather in small area in real space. Consequently, the unit points are located in the same pixel or adjacent pixels. This requires repetition of the same computation many times over in order to calculate the likelihoods of the multiple candidate curves.

In the present embodiment, absolute edge position information which has no dependence on the positions of the unit points is calculated for whole region of the edge image to create a distance map. The distance map is similar to a common reference table for all unit points in the edge searching process. Specifically, the distances between the edge and respective pixels in the horizontal direction are stored as pixel values. The distance map is referred to by each of the first model tracking unit 27a through to the $n^{th}$ model tracking unit 27n. Therefore, the distance map is generated by the sampling unit 29 based on the edge images of the image frames and stored in a shared memory (not shown) for the first model tracking unit 27a through to the $n^{th}$ model tracking unit 27n, for example.

Figure 7:
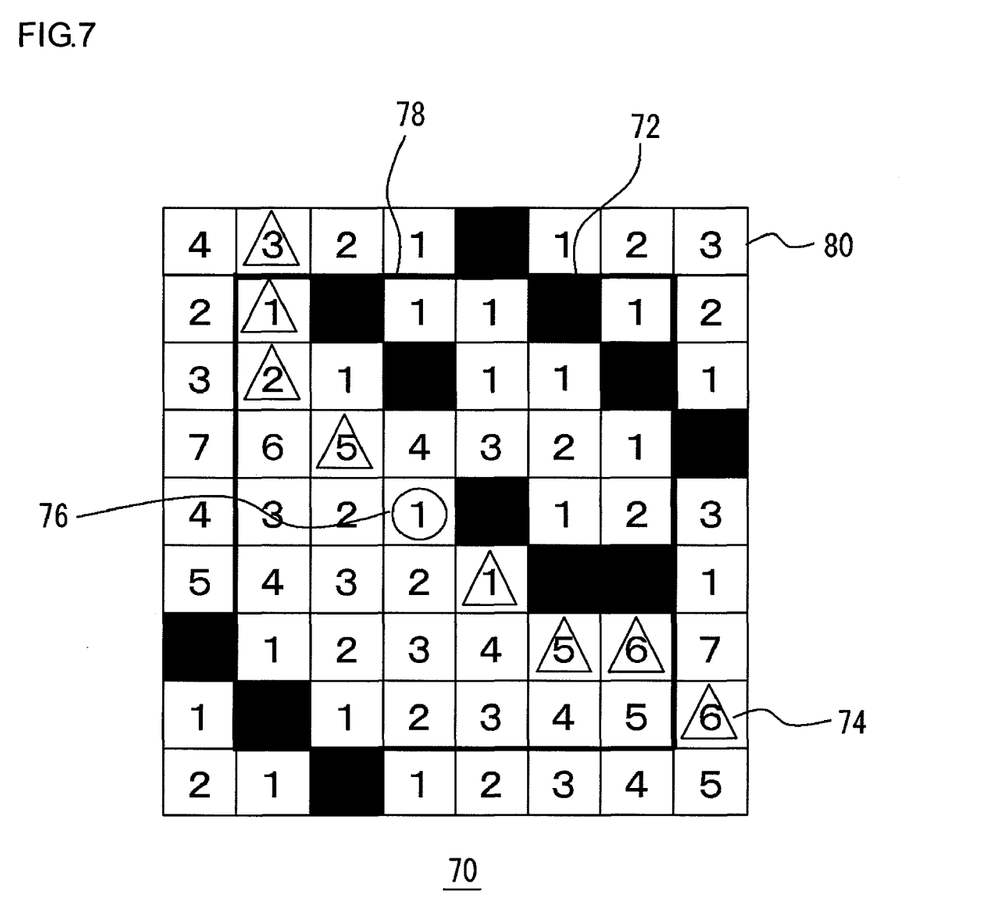
FIG. 7 shows an exemplary distance map according to the embodiment.

FIG. 7 shows an example of the distance map. In FIG. 7, small squares arranged in matrix form indicate pixels 80, and the solid black squares indicate edges 72. The distance from the closest edge 72 to the pixel 80 in the horizontal direction is set as the pixel value in the distance map 70. The values are natural numbers where the width of a pixel 80 is defined as a unit.

The first model tracking unit 27a through to the $n^{th}$ model tracking unit 27n apply the candidate curves described by the particles, which are transited based on respective motion models, to the distance map 70 in S30a to S30n. With reference to FIG. 7, the pixels 80 indicated by a triangle or circle form a candidate curve 74. An area centered about a unit point 76 indicated by a circle in the candidate curve 74 is defined as a search area 78. Since the density of the unit point depends on the size of the candidate curve 74, the size of the search area 78 is normalized so that the larger the candidate curve 74, the wider the search area. Specifically, the size of the search area 78 is calculated based on the magnification (extend$_□$, extend$_□$) of the parameters of each particle. Accordingly, the probability that the edge close to the entire candidate curve can be detected is normalized, thereby providing an accurate likelihood distribution in the parameter space. The relationship between the candidate curve 74 and search area 78 is defined based on either experiments or simulations.

Although the search area 78 has a square shape in FIG. 7, the shape is not limited to square. For example, search area 78 may have a circular shape centered about the unit point 76 or a line shape such as the normal of the candidate curve 74 for the unit point 76. The shape of the search area 78 is preset based on either experiments or simulations in terms of search efficiency and accuracy.

Figure 8:
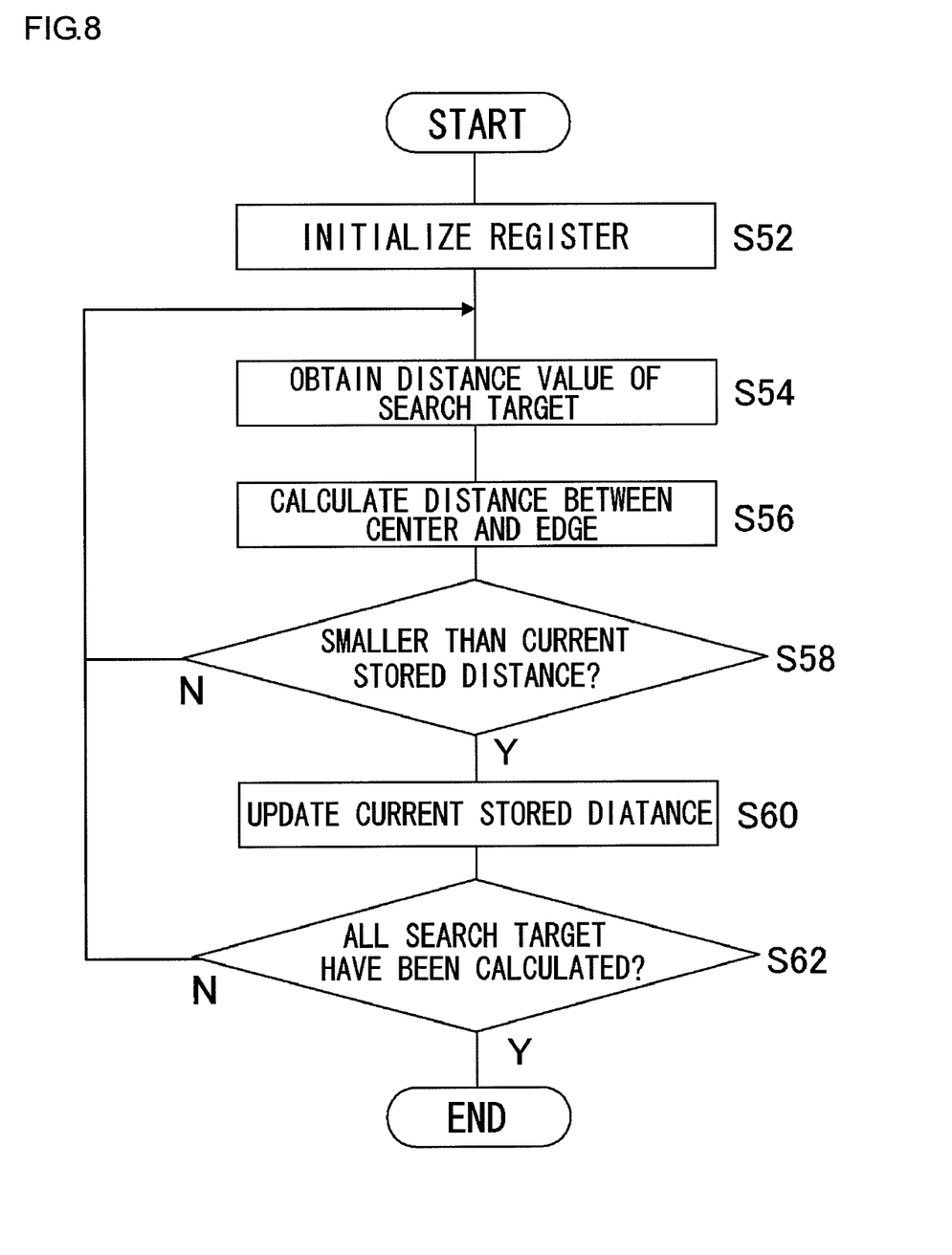
FIG. 8 is a flow chart showing a procedure of calculation of a distance between a unit point and the closest edge using the distance map.

FIG. 8 is a flow chart showing the calculation procedure for a distance between the unit point 76 and the closest edge 72 using the distance map 70. Registers (not shown) included in the first model tracking unit 27a through to the $n^{th}$ model tracking unit 27n respectively are first initialized (S52). The search area 78 is then determined based on the position of the unit point 76, and the pixel values of the pixels 80 contained in the search area 78 are obtained from the distance map (S54).

Next, the distance between the center of the search area 78, i.e., the position of the unit point 76, and the edge 72 is calculated (S56). Since each pixel value obtained from the distance map in S54 is the horizontal distance between the pixel 80 and the closest edge 72, the distance between the center and the edge 72 can be calculated from the pixel value and the vertical distance between the center and the pixel. Therefore, the searching in the entire search area 78 can be achieved in this stage only by setting the pixels vertically arranged in a line through the center as the search targets.

The pixel value of the central pixel in which the unit point 76 being the search start point is located, is stored as "the current closest distance" in the register. Next, from the pixel value of the pixel 80 located right above or below the center, and the vertical distance between the center and the pixel 80, i.e., "1", the distance between the unit point 76 and the edge 72 which is included in the horizontal line passing through the pixel 80 and closest to the unit point 76 is calculated. When the edge 72 is located in the pixel 80, being the search target, the calculation value is the vertical distance between the pixel 80 and the unit point 76.

If the calculation value is smaller than the value stored in the register (S58:Y), the value of the register is updated to the new calculation value (S60). If the calculation value is not smaller than the value stored in the register (S58: N), the value of the register is not updated and the next pixel 80 up or down becomes the search target. When the aforementioned process has been performed on all the pixels 80 in the vertical line passing through the unit point 76 within the search area 78 (S62:Y), the searching is ended. As a result, the register stores the distance between the unit point 76 and the closest edge 72.

According to the present embodiment, it is possible to easily calculate the distance between the candidate curve and the closest edge 72 without using a general process, such as a process for scanning the pixels while checking the normal direction of the candidate curve, and a process for calculating the distance based on the coordinates of the edges detected and the coordinates of the unit point 76. Accordingly, even when the calculation is repeated for the adjacent unit points 76 of the multiple candidate curves, the repetition of the same process can be minimized and thereby the calculation efficiency is significantly improved.

Since the edge search in the normal direction does not detect the edge that is located in the adjacent pixel to the pixel located in the normal line, if the density of unit point 76 is low, skipping the edge close to the candidate curve may make it impossible to perform a correct likelihood calculation. In contrast, since the distance map includes the position information of the edges within the search area 78 in advance, the closest edge 72 in the two-dimensional image space can be accurately detected. Moreover, the calculation is only performed on pixels located in one line within the search area 78 during the actual search. It is thus possible to improve detection accuracy while preventing an increase in computational cost. As a result, it is possible to provide a highly accurate, efficient tracking process.

The operation described above allows for head tracking of a person who comes into the viewing angle of a fixed camera. This makes it possible to perform tracking of a person in an environment where a fixed camera is installed, such as at an automated teller machine (ATM) of a bank, for example. Analysis of the motion of the head based on the tracking result may allow for detection of suspicious behavior. Moreover, a face identification process focusing on the head region may allow for both efficient detection of a suspicious person and extraction of facial features.

The tracking process shown in FIG. 6 is also applicable for other uses, such as the editing of video data which has been captured by a video camcorder, allowing the tracker 14 to track any person(s) included in the video data in order to edit the video data based on the tracking result. In the video editing, upon tracking of a person shown in an image, an ohm-shaped template is prepared as in the case previously described using the fixed camera. Even when the target object is not a person, for example, if it is an animal, insect, or vehicle, a B-spline curve describing its shape or a part of the shape is prepared accordingly. The tracker 14 may store the templates describing expected shapes in advance so that a template suitable for the object's shape is chosen from those templates.

In this case, the tracking start-and-stop determining unit 28 performs the determination process for starting tracking in S22 in the same manner as the aforementioned operation. The criteria described earlier may be used in the present case. Alternatively, the tracking start-and-stop determining unit 28 may request the image processing unit 22 to perform a face detection process and start tracking when the face with a given size is detected.

When the tracking start-and-stop determining unit 28 makes the determination to start tracking, the sampling unit 29 generates a probability density distribution $p(\hat{x}_0^i)$ from the edge images generated by the image processing unit 22. The edge images are generated using a typical edge extracting algorithm, such as the Canny edge filter or the Sobel filter, by the image processing unit 22. Alternatively, the image processing unit 22 may extract, as with the edges, boundaries of segments into which a target area is divided by a typical segmentation algorithm which performs segmentation based on area characteristics such as pixel color and texture, or a subject's motion. Depending on which algorithm is used for the edge extracting process, an algorithm with a high accuracy may be determined in advance based on experiments and the like, or an algorithm suitable for the characteristics of the input video may be chosen accordingly.

Similarly to the case of the fixed camera, the sampling unit 29 generates particles based on the probability density distribution $p(\hat{x}_1^i)$ and transits the particles by applying the motion models to them, in S28a to S28n. Meanwhile, a motion model that can predict the characteristic motion of the subject using an autoregression motion model has already been prepared for each category of the input video. For example, if the input video shows a soccer play, motion models for a shoot and feints are prepared in advance. In addition to this, a Gaussian motion model that can cover motions other than the characteristic motions is also prepared.

Next, the likelihood for each particle transited is observed (S30a to S30n), and one series of observation results are chosen (S32). The data describing the shape and the position of the target object are generated and stored in the result storage unit (S34).

The processes of S26 to S34 are performed on each image frame. In real space, the tracking is ended when the tracking start-and-stop determining unit 28 determines to stop the tracking, such as when a predetermined time has elapsed in the occlusion state, for example, when one target object hides behind another target object, or when a predetermined time has elapsed in the state where the target object is out of the viewing angle of the imaging device 12.

The operation as described above allows for the tracking of the person's head in the video captured by the video camcorder. Transmitting the position of the person to a framing module as tracking result data makes it possible to provide special effects easily, and for example, to perform auto framing on a specific person in the video.

Moreover, the present embodiment is also applicable to the tracking of a palm in a camera's viewing angle, allowing for human-machine interfacing. In this case, B-spline curves that describe the shapes of "rock," "paper," and "scissors" in a game of rock-paper-scissors, and shapes interpolating them are set as templates.

In this case, the sampling unit 29 uniformly places particles over a certain area of the parameter space in S20 shown in FIG. 6, and observes the likelihood for each particle based on the edge image immediately after the particles are placed. In S22, if the observation likelihood is more than a predetermined threshold, the tracking start-and-stop determining unit 28 determines to start tracking. If there is already a palm being tracked, the tracking start-and-stop determining unit 28 determines that another target object appears only when the candidate curve does not match with the palm already observed and determines to start tracking another target object. If the sampling unit 29 places the particles at predetermined time intervals in S20, the palm coming into the camera's viewing angle can always be detected. The determination to stop the tracking is the same as detailed in the above operation.

A model that can predict, using an autoregression motion model, the characteristic motions of the palm, such as changes from "rock" to "scissors", and a Gaussian motion model that can cover other motions are prepared for the motion models being applied to the particles in S28a to S28n shown in FIG. 6.

The operation as described above allows for the tracking of the position and shape of the palm in the camera's viewing angle. This application allows the shape of the palm to change, and therefore is expected to be used in human-machine interface and the like. Such a tracking is applicable to the motion of not only a palm but also of other body parts, for example, the motion of the entire body, thereby allowing for efficient motion analysis.

According to the various embodiments described above, multiple motion models are prepared for each motion characteristic of the target object, particles are transited based on each motion model, and the likelihoods with respect to respective motion models are observed in parallel. The motion model that observes the highest likelihood is chosen, and the probability density distribution of the target object is calculated from the observation likelihoods. Accordingly, it is always possible to use the motion model suitable for the motion characteristics of the target object, and thus to process the target object's motion with multiple characteristics, which is difficult for a single motion model. As a result, it is possible to maintain a high tracking accuracy even when the target object suddenly moves in unexpected ways.

When compared with a technique that determines the switching timing of multiple motion models by learning, the aforementioned embodiments are not required to perform the algorithm that determines switching, thereby eliminating learning time and reducing consumption of resources. Moreover, there is no drop in tracking accuracy due to switching errors caused by learning results. Since there is no interference region of different motion models at switching of the motion models, transition to different motion model can be performed smoothly by a simple calculation.

In addition to this, introducing the multiple motion models in a complementary manner allows for effective narrowing of the search area in the parameter space. For example, introducing a Gaussian motion model having a Gaussian distribution with a narrow skirt and an autoregression motion model with a local search area suitable for each motion model gives a narrower search area than introducing a Gaussian motion model having a Gaussian distribution with a wide skirt for covering multiple motion models. Thus, it is possible to ensure high tracking accuracy while suppressing resource loss and degradation of robust stability. Compared with the automatic switching of motion models by learning, introducing the motion model on which a user's or designer's intention is reflected makes it easy to control the size of the search area and avoid an inefficient search.

In the likelihood observation, a distance map is prepared for detecting edges closest to the candidate curve. The distance map has pixel values which indicate horizontal distances between the pixels and the closest edges. In an actual edge detection, the distances between the unit point and the edges are calculated from the distances between the unit point and the pixels vertically arranged in a line through the unit point, and their pixel values, and the distance between the unit point and the closest edge is calculated by choosing the minimum distance between the unit point and the edge. As a result, the calculation amount required for each candidate curve is reduced, and thereby the edge detection is performed without increasing the computational cost even when the search areas for many candidate curves are overlapped. Moreover, the edge detection, which is performed on the entire search area, allows for accurate likelihood observation without skipping over the edge close to the candidate curve. As a result, there is a synergistic effect between the edge search and the choice of best motion model, which allows for highly accurate tracking without increasing computational cost.

Moreover, the aforementioned embodiments have high generality and enable easy implementation because they are applicable to various devices using visual tracking by just incorporating the motion model for each motion characteristic into their processes.

Described above is an explanation based on the aforementioned embodiments of the present invention. These embodiments are intended to be illustrative in nature only and it will be obvious to those skilled in the art that variations in constituting elements and processes are possible within the scope of the present invention.

For example, in the aforementioned embodiments, the tracking integration unit 30 chooses a motion model for each particle, and estimates the probability density distribution from the likelihoods obtained by applying the respective motion models. Alternatively, one motion model may be chosen for all the particles at each timestep. For example, one motion model that gives the maximum sum of the likelihoods of the respective particles may be chosen, and the probability density distribution may be estimated from the likelihoods of the candidate curves that are described by all the particles transited according to the chosen motion model. This modification can also provide the same effect as that detailed in the above embodiments.

What is claimed is:

1. An object tracker comprising:
a sampling unit which generates particles based on an estimated existence probability distribution of a target object in a first image frame, the particles being used for a particle filter in a parameter space where candidate contours of the target object are defined and each particle defines a candidate contour, the first image frame being contained in a video stream together with a second image frame;
a plurality of model tracking units which correspond respectively to multiple motion models and observe likelihoods of the candidate contours with respect to the target object in the second image frame, the candidate contours being defined by respective particles transited according to each motion model; and
a tracking integration unit which chooses one of the motion models based on a comparison of the likelihoods observed by the model tracking units, and estimates an existence probability distribution of the target object in the second image frame based on the likelihood of a candidate contour which is defined according to the motion model chosen.

2. The object tracker according to claim 1, wherein the tracking integration unit chooses a motion model which causes the highest of the likelihoods observed by the plurality of model tracking units.

3. The object tracker according to claim 1, wherein the plurality of model tracking units include a plurality of Gaussian motion model tracking units which transit the particles generated by the sampling unit so that the particles show a Gaussian distribution centered around each coordinate in the parameter space, and
wherein each of the Gaussian motion model tracking units transits the particles so that the particles show a Gaussian distribution with different standard deviation.

4. The object tracker according to claim 1, wherein the plurality of model tracking units include autoregression motion model tracking units which perform autoregression prediction of a motion of the target object based on multiple image frames contained in the video stream, and transit, based on a result of the prediction, the particles generated by the sampling unit, and Gaussian motion model tracking units which transit the particles generated by the sampling unit so that the particles show a Gaussian distribution centered around each coordinate in the parameter space, and
wherein a distribution region of the particles showing the Gaussian distribution does not overlap with at least a part of a distribution region of the particles transited by the autoregression motion model tracking unit.

5. The object tracker according to claim 1, further comprising an image processing unit which extracts an edge of the target object from the second image frame,
wherein the model tracking unit sets for each of a plurality of points including in a candidate curve being the candidate contour, as a search area, an area having predetermined shape and size and centered around the point, detects an edge of the target object closest to the point within the search area to calculate a distance between the point and the edge, and calculates the likelihood using the distance for each candidate curve, the search area being set based on a size of the candidate curve.

6. The object tracker according to claim 1, wherein the tracking integration unit chooses a motion model which causes a highest likelihood, for each of the particles generated by the sampling unit.

7. The object tracker according to claim 1, wherein the tracking integration unit chooses a motion model which causes a maximum sum of the likelihoods of the respective particles generated by the sampling unit.

8. The object tracker according to claim 1, wherein
the model tracking unit observes the likelihood for each of multiple target objects, and
wherein the tracking integration unit estimates an existence probability distribution for each of the multiple target objects, and generates image frame data of a tracking result by combining a plurality of existence probability distributions obtained.

9. The object tracker according to claim 1, wherein the tracking integration unit detects an occurrence of occlusion of the target object, and
wherein the sampling unit stops generating particles for a target object hiding due to the occlusion when a predetermined time has elapsed from the occurrence of occlusion detected by the tracking integration unit.

10. The object tracker according to claim 1, wherein the candidate contour is described by a B-spline curve which is defined by control points and unit points.

11. The object tracker according to claim 1, further comprising a storage unit which stores in advance a plurality of curves each describing the candidate contour and having shapes of expected target objects,
wherein one curve is chosen as the candidate contour according to a shape of an actual target object, from the storage unit when starting tracking.

12. The object tracker according to claim 1, wherein the sampling unit further places the particles uniformly over a predetermined area at predetermined time intervals,
wherein the model tracking unit further observes a likelihood for each of the particles based on an edge image of an image frame immediately after the particles are placed, the image frame being contained in the video stream, and
wherein the object tracker further comprises a tracking start-and-stop determining unit which determines that a target object appears when the likelihoods, observed by the model tracking unit, for the particles uniformly placed are more than a predetermined threshold.

13. An object tracking method performed by a computer, the method comprising:
storing a received video stream in a memory;
reading a first image frame in the video stream from the memory, and applying multiple hypothetical motion models to multiple candidate contours of a target object derived from an existence probability distribution of the target object in the first image frame;
comparing the candidate contours after applying the multiple hypothetical motion models with true contour of the target object in a second image frame read from the memory, and choosing a motion model with the highest likelihood from the multiple hypothetical motion models based on the result of comparison; and
estimating an existence probability distribution of the target object in the second image frame based on the chosen motion model.

14. A non-transitory computer-readable medium having stored a computer program product causing a computer to perform an object tracking, comprising:

a program code module for storing a received video stream in a memory;

a program code module for reading a first image frame in the video stream from the memory, and applying multiple hypothetical motion models to multiple candidate contours of a target object derived from an existence probability distribution of the target object in the first image frame;

a program code module for comparing the candidate contours after applying the multiple hypothetical motion models with true contour of the target object in a second image frame read from the memory, and choosing a motion model with the highest likelihood from the multiple hypothetical motion models based on a result of comparison; and a program code module for estimating an existence probability distribution of the target object in the second image frame based on the chosen motion model.

* * * * *